US00RE39917E

(19) United States
(12) Reissued Patent
Domenig et al.

(10) Patent Number: US RE39,917 E
(45) Date of Reissued Patent: Nov. 13, 2007

(54) ROTARY SHELF ASSEMBLY MECHANISM HAVING A POST HEIGHT ADJUSTMENT DEVICE AND A NOVEL SHELF CONSTRUCTION AND SELF RETAINING ELEMENT FOR SECURING THE SHELVES TO THE POST

(75) Inventors: Georg Domenig, Kernersville, NC (US); James Rapier, Purlear, NC (US)

(73) Assignee: Peter Meier, Inc., Kernersville, NC (US)

(21) Appl. No.: 10/735,569

(22) Filed: Dec. 15, 2003

Related U.S. Patent Documents

Reissue of:
(64) Patent No.: 6,626,305
Issued: Sep. 30, 2003
Appl. No.: 09/740,554
Filed: Dec. 20, 2000

U.S. Applications:
(63) Continuation-in-part of application No. 09/640,052, filed on Aug. 17, 2000, now abandoned.

(51) Int. Cl.
*A47F 5/02* (2006.01)

(52) U.S. Cl. ..... 211/144; 211/163; 211/131.1; 211/129.1; 211/95

(58) Field of Classification Search ..... 248/235, 248/239, 241, 244, 243, 250; 211/95, 78, 211/163, 207, 208, 131.1, 129.1, 144; 403/109.1, 403/109.2, 109.4, 379.3, 378; 312/305
See application file for complete search history.

(56) References Cited

U.S. PATENT DOCUMENTS 918,579 A * 4/1909 Murch ..... 248/353
2,008,180 A * 7/1935 Karnes ..... 211/193
2,124,842 A * 7/1938 Zierold et al. ..... 135/26
2,350,582 A * 6/1944 Booth ..... 403/379.3
2,423,577 A * 7/1947 Booth ..... 403/379.3
2,527,132 A * 10/1950 Jackson et al. ..... 248/131
2,951,593 A * 9/1960 Lake ..... 108/139
2,978,285 A * 4/1961 Jester ..... 312/284
3,127,994 A * 4/1964 Campbell ..... 211/144
3,435,959 A * 4/1969 Levy et al. ..... 211/163
3,628,844 A * 12/1971 Preston ..... 312/305
4,433,885 A * 2/1984 Baker
4,486,106 A * 12/1984 Benting ..... 384/248
4,572,595 A * 2/1986 Craig
4,587,908 A * 5/1986 DeBruyn
4,616,940 A * 10/1986 DeBruyn (Continued)

*Primary Examiner*—Gregory J. Strimbu
(74) *Attorney, Agent, or Firm*—MacCord Mason PLLC

(57) ABSTRACT

A rotary shelf assembly mechanism has shelves mounted on a vertical post arrangement formed by a first lower post and a second upper post. The mechanism is connected to a cabinet by upper and lower mounting brackets interacting with the top and bottom of the cabinet to support the posts and shelves carried thereby. The mechanism is mounted in the corner of the cabinet. To fit the mechanism within the cabinet, a height adjustment device is formed by positioning the second upper post in the upper end of the first lower post for slidable movement therebetween. When securement of the two joined posts and mounted shelves is desired, the slidably movable second upper post is extended upwardly until it engages the upper mounting bracket mounted on the cabinet. An elongated recess in the second upper post aligns with an opening in the first lower post, and a threaded member extends into a casting positioned within the upper post. The threaded member is tightened to engage the casting and secure the two posts in a shelf-retaining and rotational mode. The height adjustment device enables quick and efficient installation of the mechanism within the cabinet interior. The mechanism also includes a one piece shelf construction having a post-securing section and a shelf-retaining pin.

1 Claim, 11 Drawing Sheets

U.S. PATENT DOCUMENTS 4,688,686 A * 8/1987 Mitts et al. ..... 211/183
4,693,188 A * 9/1987 Twellmann ..... 108/139
4,819,900 A * 4/1989 Funk ..... 248/244
5,050,746 A * 9/1991 Frankel ..... 211/34
5,287,869 A * 2/1994 Wu ..... 135/25.1
5,312,003 A * 5/1994 Domenig
5,354,025 A * 10/1994 McCaffrey ..... 248/188
5,494,346 A * 2/1996 Domenig
5,702,198 A * 12/1997 Kuo ..... 403/377
5,931,315 A * 8/1999 Lorentz et al. ..... 211/40
5,941,399 A * 8/1999 Wang ..... 211/187
6,017,108 A * 1/2000 Domenig

* cited by examiner

Fig. 9
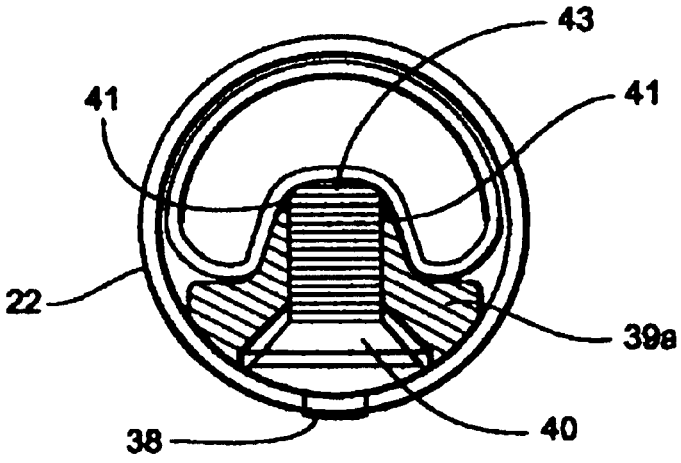
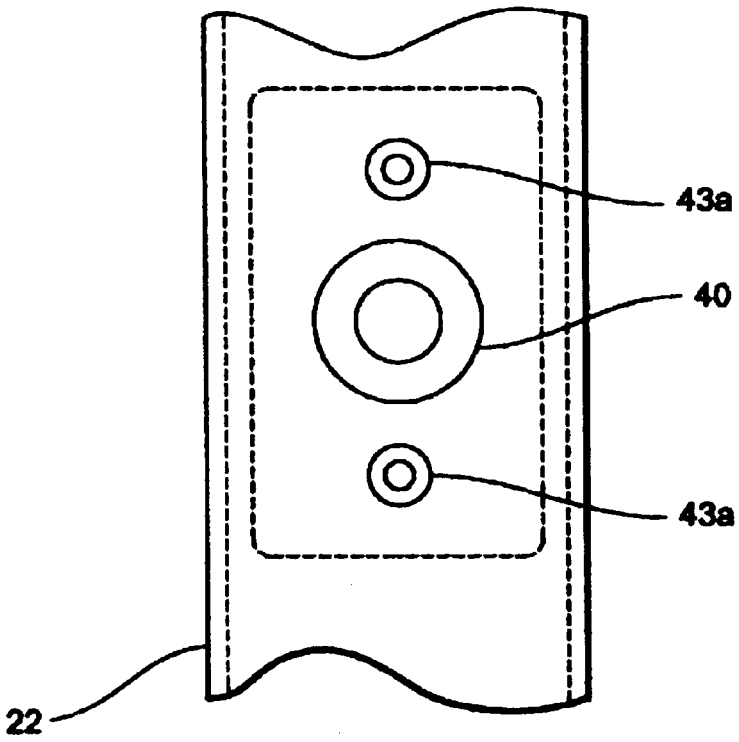
Fig. 10

ROTARY SHELF ASSEMBLY MECHANISM HAVING A POST HEIGHT ADJUSTMENT DEVICE AND A NOVEL SHELF CONSTRUCTION AND SELF RETAINING ELEMENT FOR SECURING THE SHELVES TO THE POST

Matter enclosed in heavy brackets [ ] appears in the original patent but forms no part of this reissue specification; matter printed in italics indicates the additions made by reissue.

The present application is a continuation-in-part application of pending U.S. patent application Ser. No. 09/640,052 filed Aug. 17, 2000 now abandoned.

BACKGROUND OF THE INVENTION

1. Field of the Invention

The present invention relates to a rotary shelf construction and assembly and to a shelf-supporting post height adjustment device to secure the post and carried shelves in a pre-selected relationship within the cabinet along with a shelf sustaining element to enable the speedy attachment and detachment of shelves to the post.

2. Description of the Prior Art

It has been common practice to provide corner kitchen cabinet shelves of a rotatable or "Lazy Susan" type. Such shelves are desirable because, without them, much cabinet space in the corner either above or below the kitchen counter is wasted due to the inaccessibility of items well back in the corner.

One of the problems encountered with such a structure is the variance of non-uniform distances between the top and bottom of the cabinet thus requiring some accommodation for the length of the post in order for the post and shelves to fit and function properly within the cabinet.

U.S. Pat. No. 4,587,908 discloses a vertically adjustable post assembly wherein an upper post is telescoped into the upper end portion of a lower post and adjusted vertically relative thereto. Vertical adjustment is provided by an end cap attached to the upper end of the lower post by a set screw. The end cap is formed with a V-shaped key which fits into a formed channel in the upper post to prevent the upper post from rotating relative to the lower post while permitting vertical adjustment of the upper post. While the reference discloses a workable combination, it does require an end cap to slide over the upper end of the lower post thus allowing a key formed on the upper bracket to fit within the formed channel in the upper post, a combination of elements obviously more expensive than desired.

U.S. Pat. No. 4,572,595 includes an assembly having a sleeve member with first and second end portions and defining a coaxial hole therethrough. The hole slidably receives the upper end portion of the rotating support shaft, and a set screw adjustably secures the sleeve member to the rotating support shaft such that it rotates with the shaft. This fitting prevents rotational slippage, however it does not provide vertical adjustability.

U.S. Pat. No. 4,688,686 provides for post vertical adjustment through a height adjustment mechanism wherein a diamond tooth knurled cylindrical segment is rotated to threadably raise and lower the post to the desired position. A locking screw secures the vertically positioned elements in a fixed condition.

U.S. Pat. No. 4,433,885 provides vertical adjustment by means of a wedge movable horizontally against a bearing support to provide vertical adjustability.

All of these references disclose workable vertically adjustable features, however some wear excessively after frequent use. All of these adjustments are somewhat troublesome, time consuming, relatively expensive and oftentimes laborious.

In addition, some of the prior art references relating to adjusting the height of a shelf assembly require the use of special tools, and frequently the adjusting mechanisms were not easily accessible. The shelves are conventionally secured to the post in corner units like those described by the insertion of pins and other post securing attachments to permit movement of the shelf upwardly and downwardly along the post. Usually it is necessary to utilize several elements in combination to accomplish this securement thus making shelf securement rather expensive and time consuming.

Shelf construction for Lazy Susan assemblies have traditionally included the use of several separate components that were combined to form the finished shelf. Additional and separate structure was also needed to affix the shelf to the supporting post. A collar was often positioned under the shelf with a pin extending through it to engage the post and frictionally hold the collar in a stationary position and thereby support the shelf during use. Shelves made of multiple components are expensive and involve considerable time and adjustment when installed. For this reason there is a need to improve shelf structure and reduce the time normally involved in shelf installation and adjustment.

OBJECTIVES AND SUMMARY OF INVENTION

Accordingly, it is an object of the present invention to provide a rotary shelf assembly wherein the height of the shelf assembly can be easily adjusted.

A further objective of the invention is to provide a novel adjustable mechanism for adjusting the vertical height of the support means of the rotary shelf assembly of the present invention.

Yet another object of the invention is to provide a rotary shelf assembly of the type described for use in corner areas of kitchen cabinets primarily known as "Lazy Susans" wherein the height of the shelf assembly can be adjusted to fit the varying space experienced in current construction.

Yet still another object of the present invention is to provide a rotary shelf assembly for use in corner areas of kitchen cabinets than can be expeditiously and efficiently installed within the cabinet frame without the tedious assembly of a combination of components.

A further objective is to provide a uniquely formed one piece shelf with a post-securing shelf section which enables securement of a shelf to the post with a single pin.

The present invention is a post height adjustment mechanism for adjusting the height of a rotary shelf assembly and enabling the speedy and efficient installation of the assembly within the cabinet frame. The adjustment mechanism includes a first tubular post and a second tubular post sized to be telescopically received within the first or top end of the first tubular post and having an elongated recess extending longitudinally along the axis of the second tubular post. The first tubular post has an opening to receive a mating screw extendable through a wall of the first post and securably extending into the elongated recess to attach to a casting member within the second tubular post to the first tubular post at a pre-selected location thus configuring the joined posts to the precise distance between the first and second mounting brackets and avoiding rotational shelf/post slippage. The advantages associated with this configuration include the ability to detach the first tubular post from the second tubular post and consolidate the shelf assembly for shipping.

This invention also includes a uniquely formed one piece shelf with a post-securing shelf section which enables securement of a shelf to the post with a single pin. The post-securing shelf section is a hub-like configuration accommodating the post and containing a molded recess to cooperatively receive a pin that has been passed through the post and extends outwardly therefrom on both sides.

The invention also includes a flexible shelf securing element partially encircling the post when installed and adapted to slide within the post opening of each shelf and further secure the engaged shelf at a pre-selected location along the post.

Thus there has been outlined the more important features of the invention in order that the detailed description that follows may be better understood and in order that the present contribution to the art may be better appreciated. There are, of course, additional features of the invention that will be described hereinafter and which will form the subject matter of the claims appended hereto. In that respect, before explaining at least one embodiment of the invention in detail, it is to be understood that the invention is not limited in its arrangement of the components set forth in the following description and illustrated in the drawings. The invention is capable of other embodiments and of being practiced and carried out in various ways.

It is also to be understood that the phraseology and terminology employed herein are for the purpose of description and should not be regarded as limiting in any respect. Those skilled in the art will appreciate that the concept upon which this disclosure is based may readily be utilized as a basis for designing other structures, methods and systems for carrying out the several purposes of this development. It is important that the claims be regarded as including such equivalent methods and products resulting therefrom that do not depart from the spirit and scope of the present invention. The application is neither intended to define the invention of the application, which is measured by its claims, nor to limit its scope in any way.

Thus, the objectives of the invention set forth above, along with the various features of novelty which characterize the invention, are noted with particularity in the claims annexed to and forming a part of this disclosure. For a better understanding of the invention, its operating advantages and the specific results obtained by its use, reference should be made to the following detailed specification taken in conjunction with the accompanying drawings wherein like characters of reference designate like parts throughout the several views.

BRIEF DESCRIPTION OF THE DRAWINGS

FIG. 3b is a top plan view of the joined posts shown in FIGS. 2 and 3a;

FIG. 9 is a top sectional view of the joined first and second posts being held in a fixed relationship with each other by the casting of FIG. 7 and an enabling screw;

FIG. 10 is a side elevational, sectional and fragmentary view of the first and second joined posts and the casting used to maintain the posts in a fixed position with respect to each other;

DETAILED DESCRIPTION OF THE PREFERRED EMBODIMENT

Figure 1:
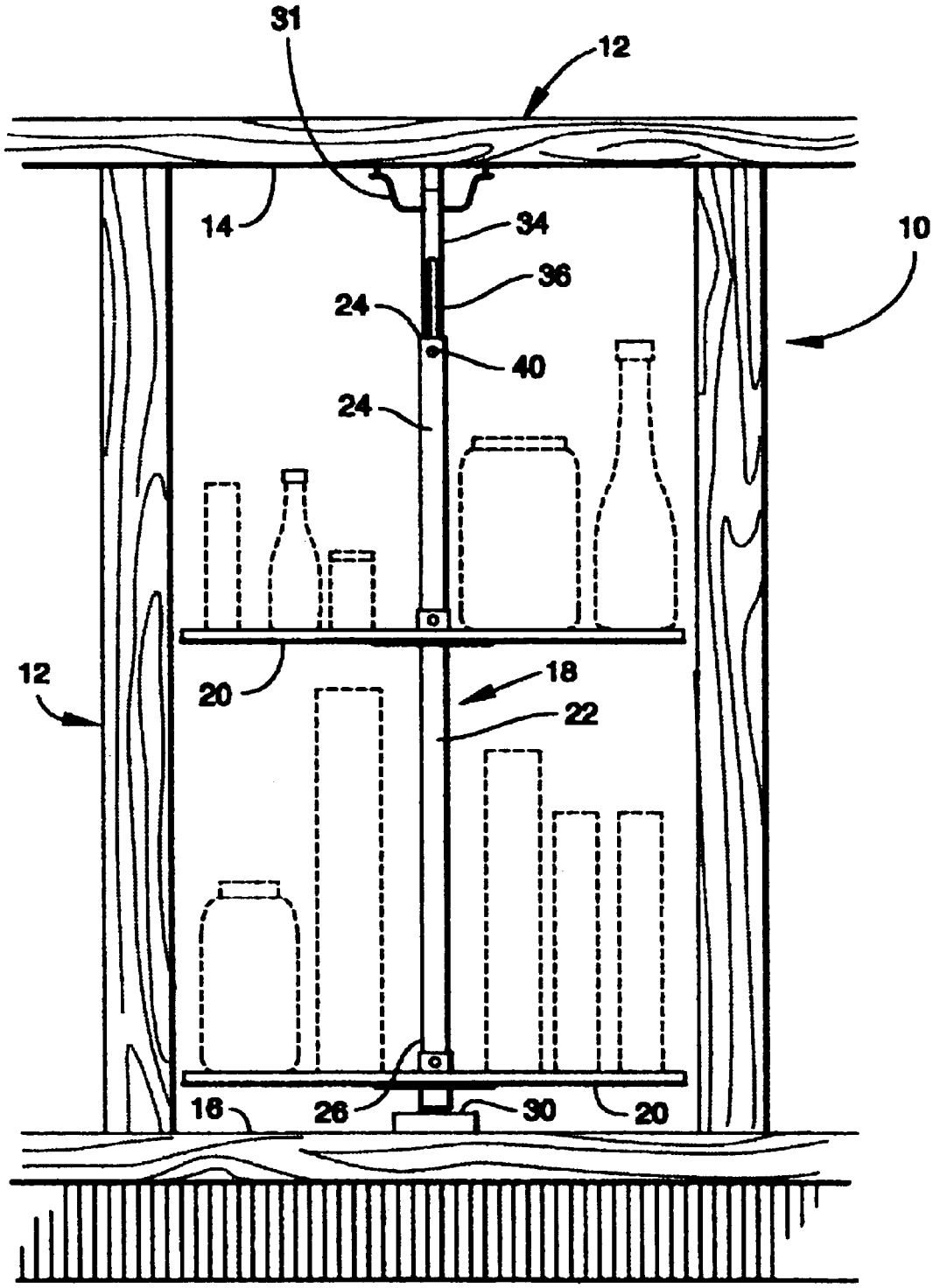
FIG. 1 is a side elevational view of the rotational shelf apparatus embodying a part of the present invention positioned within a cabinet frame.
Figure 2:
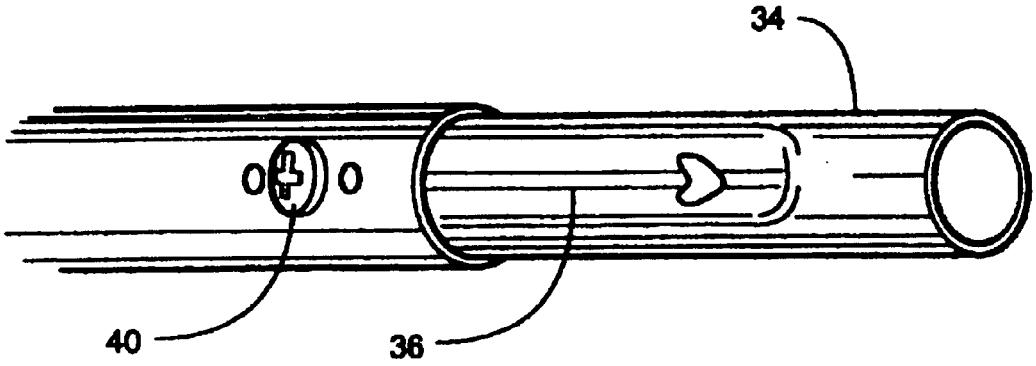
FIG. 2 is a perspective and enlarged view of the upper end of a tubular post formed from a telescopically insertable second tubular member having an elongated recess capable of receiving a screw to secure the posts in a fixed relationship.

A rotational shelf assembly incorporating various features of the present invention is illustrated generally at 10 in FIG. 1. Shelf assembly 10 is designed to be installed in a cabinet 12 having installation surfaces comprising a ceiling surface or top 14 and a floor surface or bottom 16. However, it will be appreciated that the use of the assembly 10 is not confined to cabinet interiors and can be adapted for mounting in various storage areas having the necessary installation surfaces. Moreover, it will be understood that while assembly 10 has been titled a rotational shelf assembly, the term "shelf" as used herein encompasses various support structures for supporting items to be stored.

As shown in FIG. 1, assembly 10 comprises a support assembly 18 for rotatably mounting adjustable shelves 20. Support assembly 18 includes a first rotational support post 22 having upper and lower end portions 24, 26, the lower end portion 26 engagably supported by mounting bracket 30 and the upper part of post 22 being supported by upper bracket 31 as shown. A plurality of shelves 20 are fixedly secured to post 22 to be rotated in unison therewith.

Adjustment features, particularly vertical adjustment features, are required for installations of this nature because of the varying distances between cabinet 14 and cabinet bottom 16. Variations in distances may be several inches depending upon the cabinetry involved, and it is necessary to provide adjustment devices to allow for these variations and yet maintain the post 22 and attached shelves 20 in a stationary and stable condition. It is also desirable to utilize a mechanism for installing the shelves and the supporting posts within the cabinet frame that can be easily installed and efficiently adjusted or removed for shipment without the use of a combination of elements and tedious installation procedures.

Figure 3B:
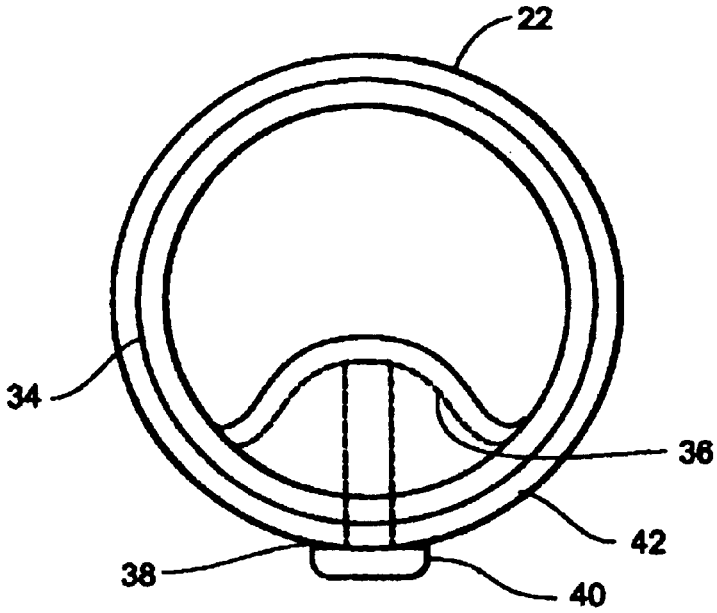
Figure 3A:
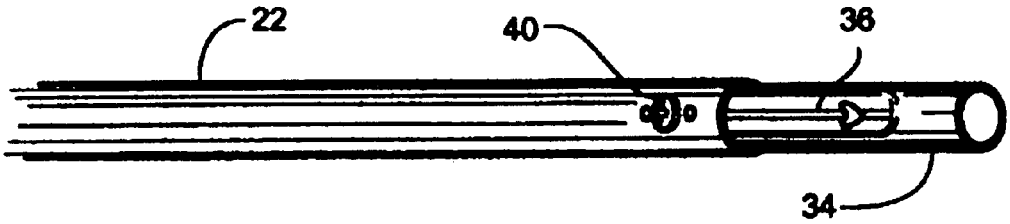
FIG. 3a is a perspective view of the joined posts shown in FIG. 2.

The present invention utilizes a post height adjustment assembly or device which includes a second tubular post 34 telescopically received within a first tubular post 22 as shown in FIG. 1. Second post 34 is a tubular member having an elongated recess 36 extending longitudinally along the second tubular post axis. An aperture 38 (FIG. 3) cooperatively receives a mating screw 40 extending through wall 42 of first post 22 into elongated recess 36 in a fixedly securable manner so that second post 34 and first post 22 are secured at a pre-selected location to span the distance between top interior 14 and bottom 16 and insure that there is no rotational slippage.

Figure 4:
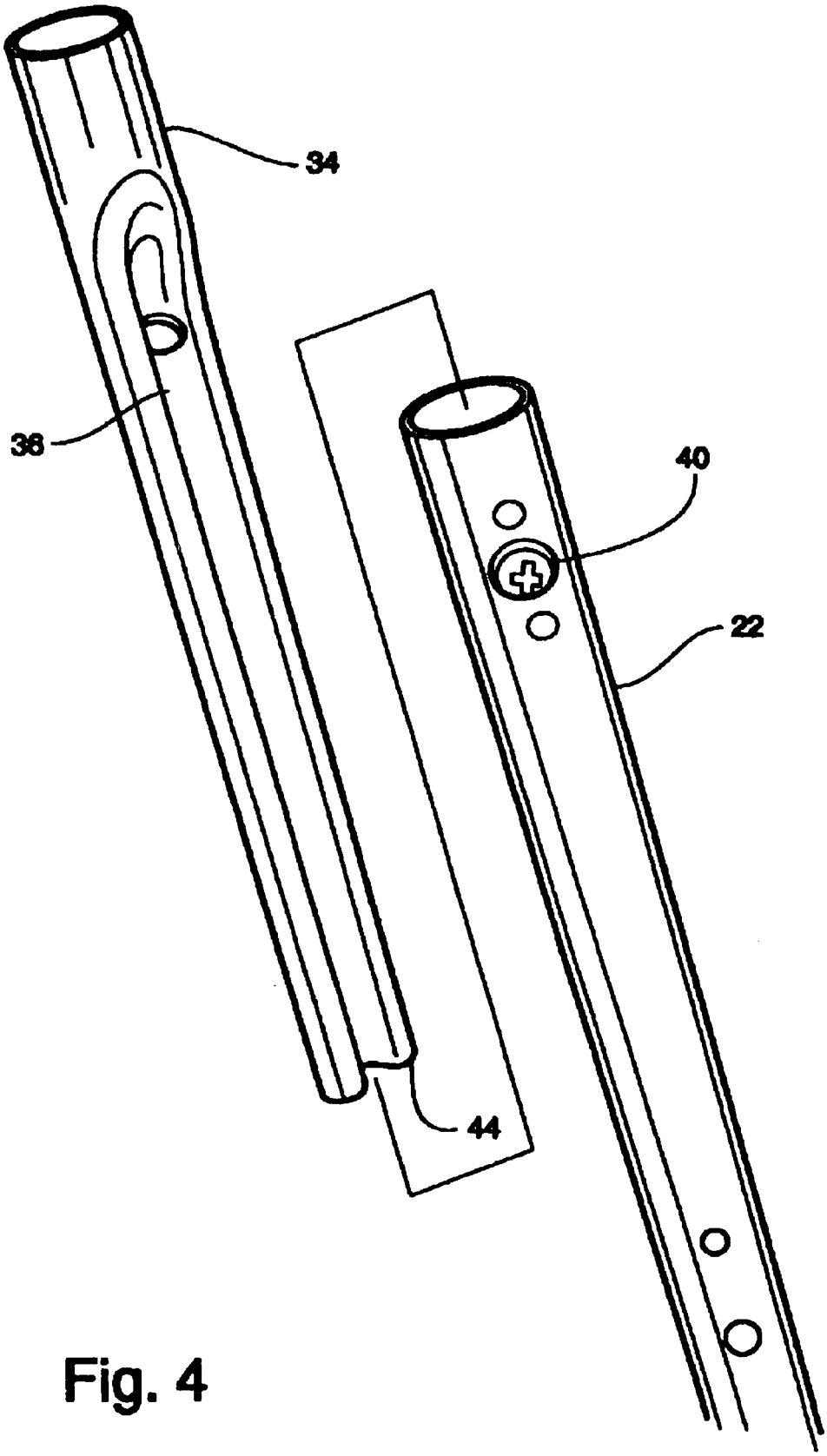
FIG. 4 is a perspective view of the first and second joinable posts in a separated condition.
Figure 5:
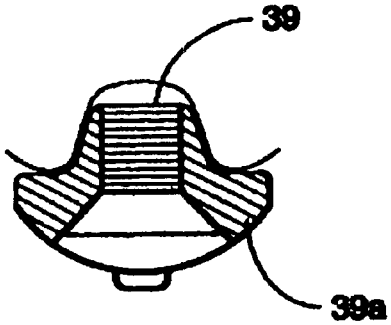
FIG. 5 is a side elevational cross sectional view of the casting shown in FIG. 7 taken along the line 5-5.
Figure 6:
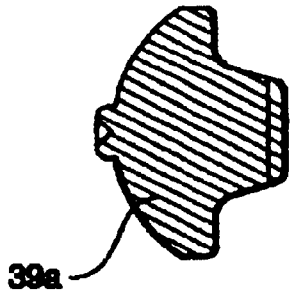
FIG. 6 is a side elevational cross sectional view of the casting shown in FIG. 7 taken along the line 6-6.
Figure 7:
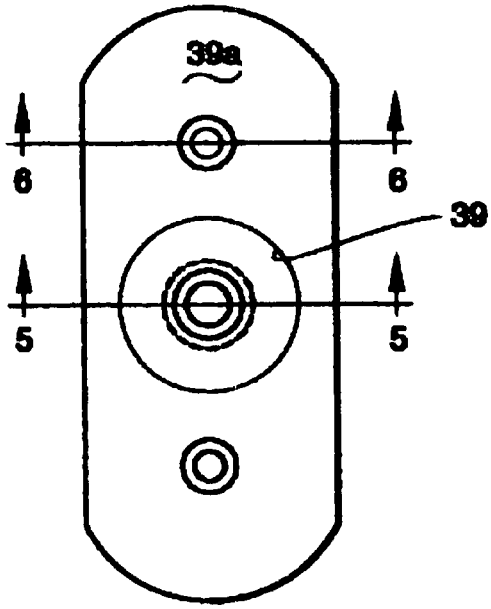
FIG. 7 is a top plan view of the casting utilized in the securement of the first post to the second joinable post.
Figure 8:
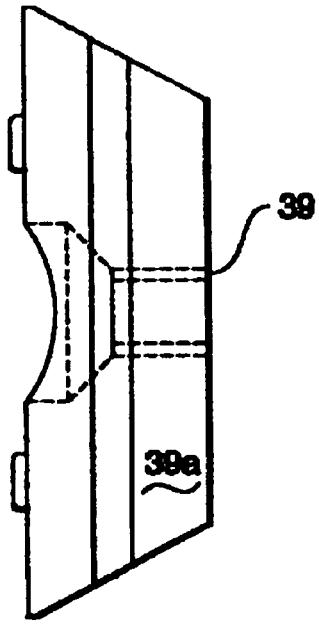
FIG. 8 is a side elevational sectional view of the casting shown in FIG. 7.

Because elongated recess 36 extends for a distance of several inches, it allows second tubular post 34 to be moved upwardly or downwardly within first tubular post 22 to an exact pre-determined location suitable to fit reliably within a given cabinet interior dimension and to be thereafter secured by screw 40 to maintain that position. Recess 36 can extend from somewhere within the mid portion of post 34 all the way to one end 44 as shown in FIG. 4. Alternatively, the recess might extend end-to-end of post 34 if that were desired.

It has been found most convenient to have the elongated recess length to run from approximately four to approximately eight inches. It has also been found to be desirable to have the depth of the elongated recess to run from approximately one-eighth inch to approximately one-half inch.

The simplicity of the present invention means is readily appreciated by noting that recess 36 can be produced by exerting pressure along the longitudinal axis of post 34 to form a depression. Aperture 38 in post 22 can be anywhere along the surface of post 22 so long as it is positioned radially of that post.

Screw 40, may be inserted in a threaded aperture 39 within a casting 39a and moved radially toward the longitudinal axis of post 22 where it eventually engages the lower curved portion 41 of recess 36 where it tightens. The forward end 43 of screw 40 does not engage the bottom of recess 36, the complete tightening of screw 40 taking place within lower curved portion 41.

Casting 39a is formed as shown in FIGS. 5-9 wherein a substantially solid piece of preferably metallic material is formed with an arcuate surface to cooperatively abut with the interior surface of tubular member 22. Bradable extensions 43a are formed on the arcuate surface to coincide with apertures provided in tubular member 22. These bradable members can then be spread by a special tool to secure the casing against the interior of vertical post 22.

Threaded aperture 39 of the casting cooperatively receives screw 40 reached through a larger opening in vertical post 22 and is tightened into the lower curved surface portion 41 of recess 36 as previously explained.

Adjusting the device of the present invention is simple and efficient, element 40 being readily accessible through the open door of the cabinet. Since only movement of post 34 with respect to post 32 is required and tightening of screw 40 completes the securement, little difficulty is experienced in effecting such adjustment. The simple connection of post 34 with post 32 provides an efficient installation of the totally formed post and supported shelves within the cabinet frame.

Figure 11:
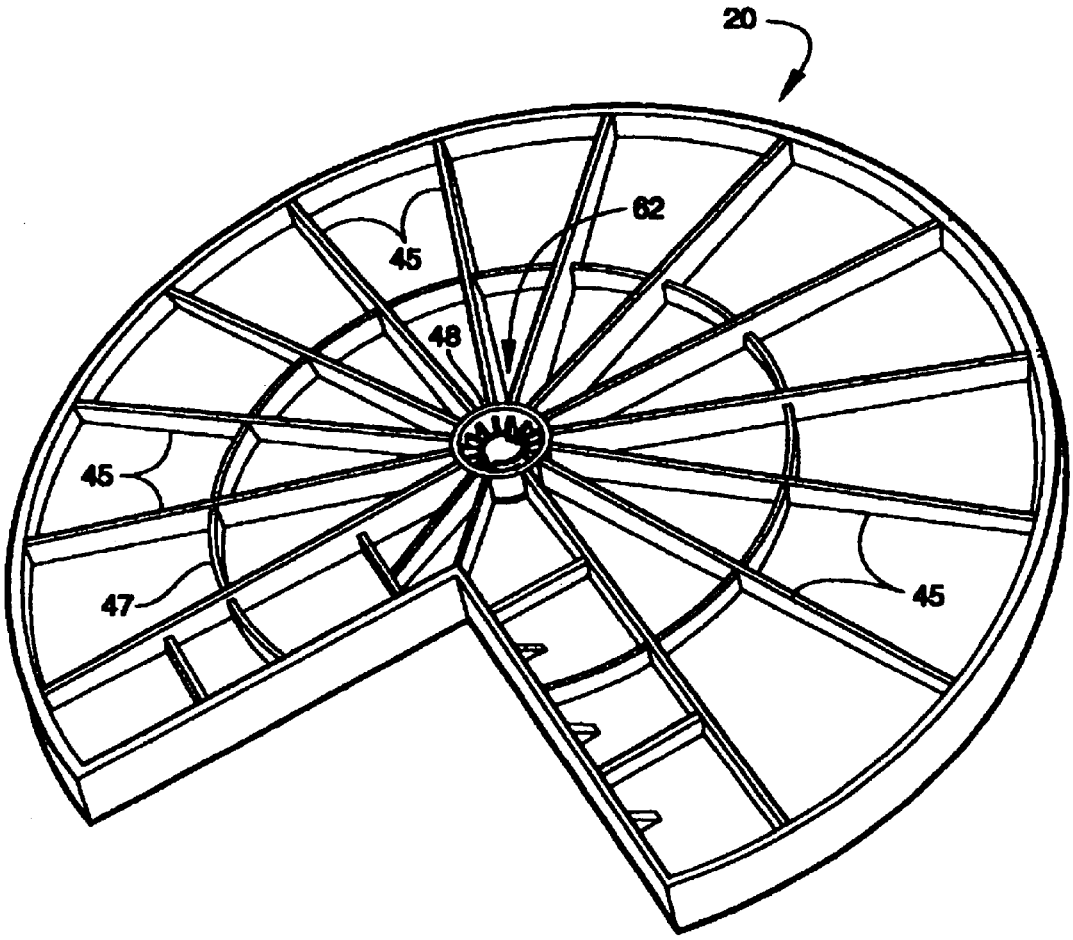
FIG. 11 is perspective view of the new shelf construction displaying for the most part the underside of the shelf.
Figure 12:
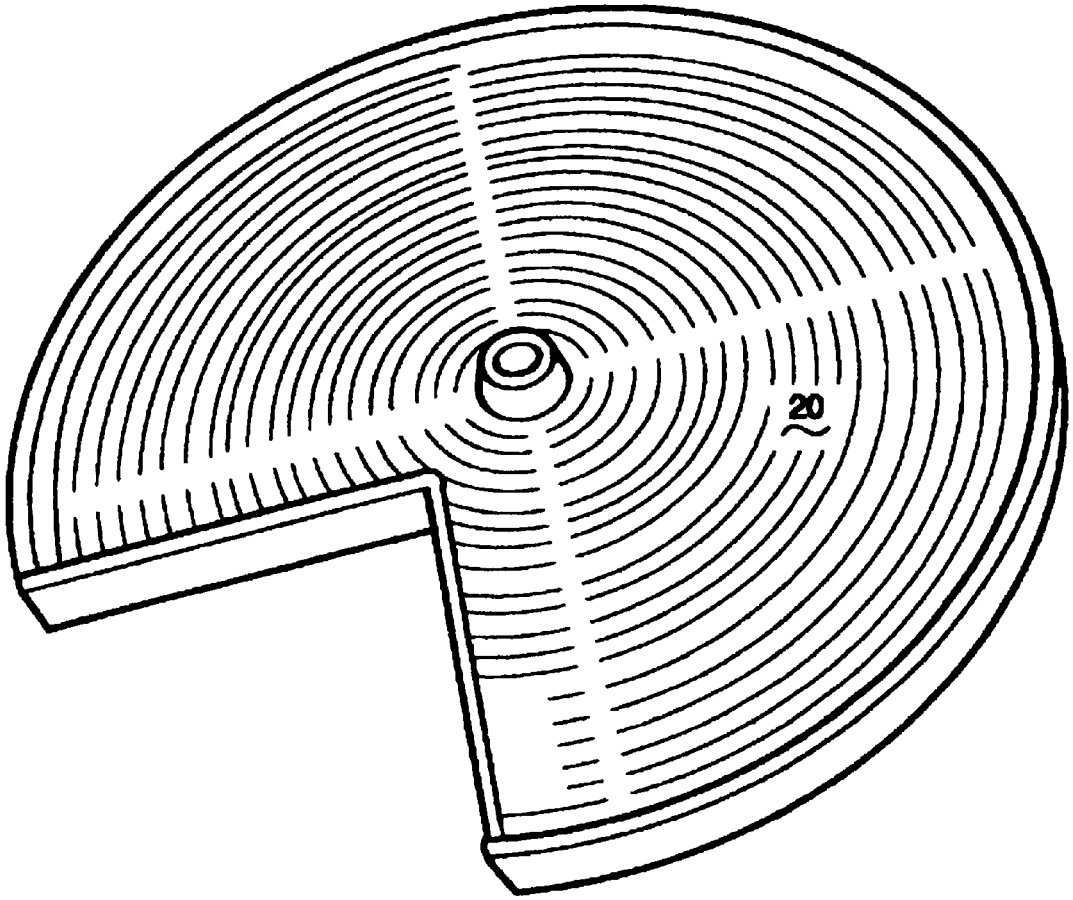
FIG. 12 is a perspective view of the new shelf construction of the present invention showing the top of the shelf.

The present invention also includes a uniquely formed one piece shelf with a post-securing shelf section which enables the securement of the shelf with a single pin. The top and bottom of the shelf is shown in FIGS. 12 and 11 respectively. The shelf is molded of a plastic or other suitable material and provided with a plurality of strengthening ribs 45 that extend radially of the circularly configured shelf from the post-securing shelf section 62. Circular supporting ribs 47 provide additional strength.

Figure 13:
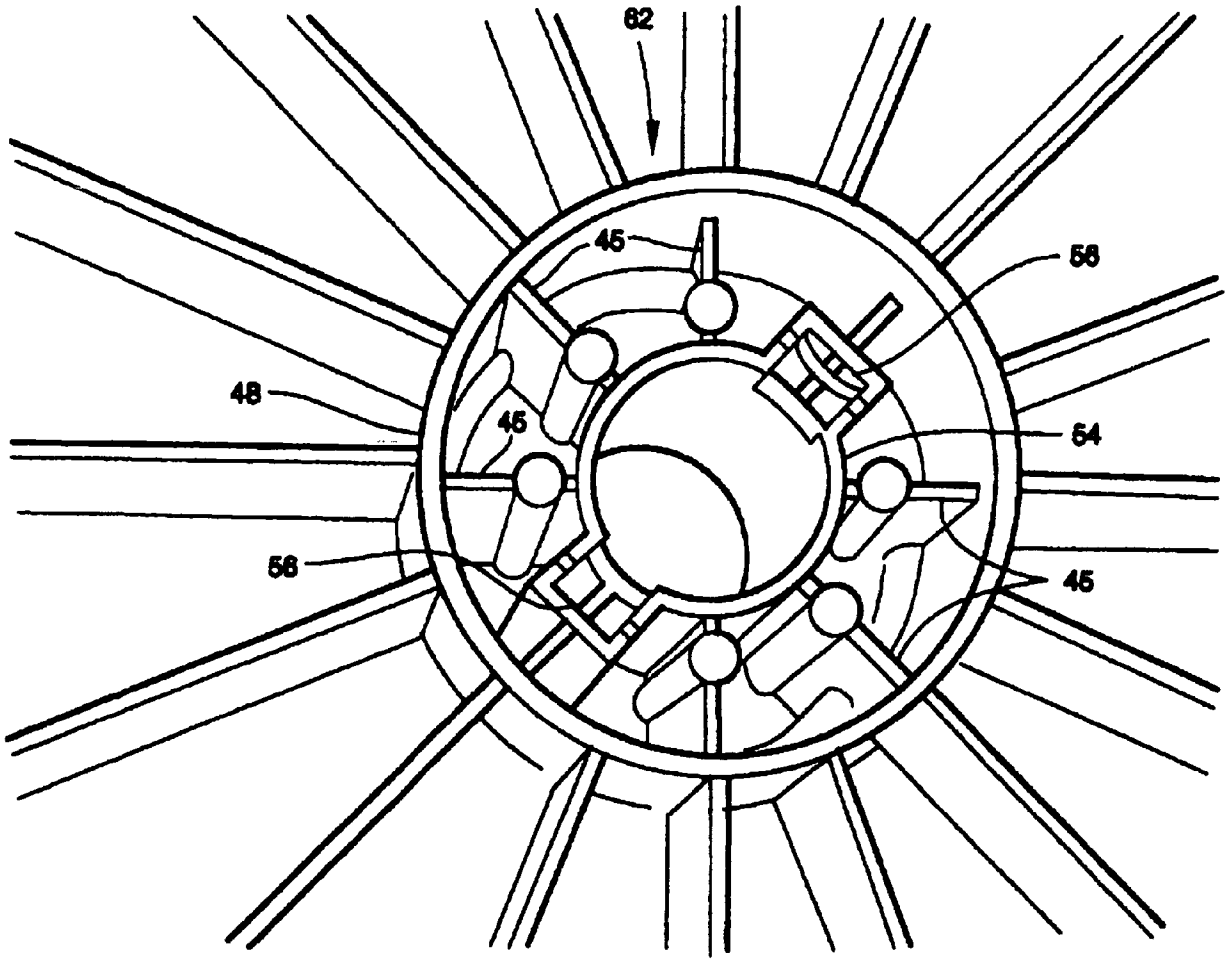
FIG. 13 is a fragmentary, enlarged and perspective view of the new shelf underside construction of the present invention primarily focusing on the post-shelf section which enables securement of a shelf to the post with a single pin.
Figure 13A:
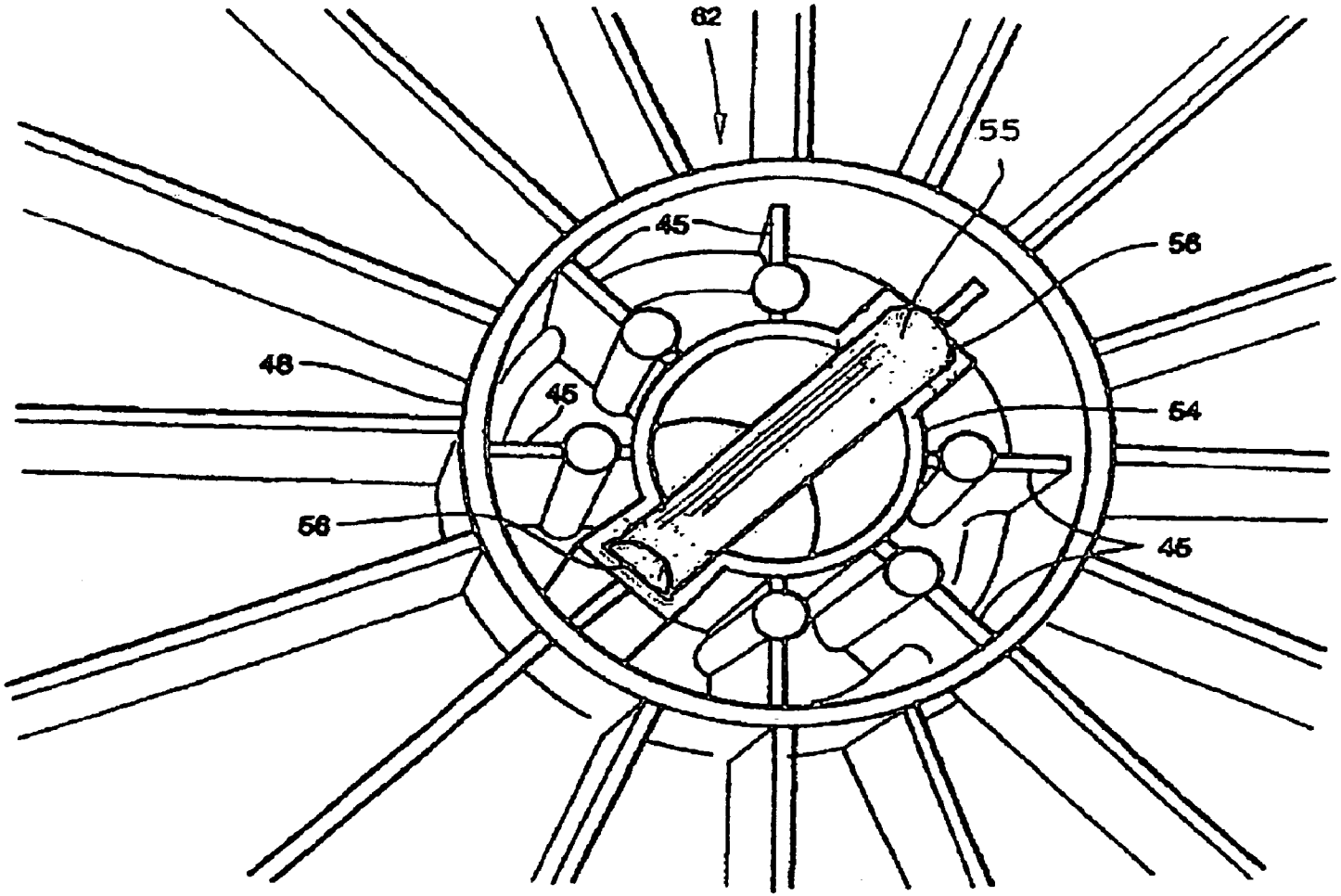
*FIG. 13a is like FIG. 13 with a pin inserted in the detents;*

Post-securing shelf section 62 is made up of a circular hub 48 ([FIG. 14] *FIG. 13a*) which houses within its formed interior 58 the plurality of radially extending ribs 45 emanating from a post encircling sleeve 54. Two pin-receiving indents 56 cooperatively open into sleeve 54 so that a pin *55* inserted through post 22 (FIG. 14) will nest within indents 56 and be within the interior hub 48 and post 22.

Figure 14:
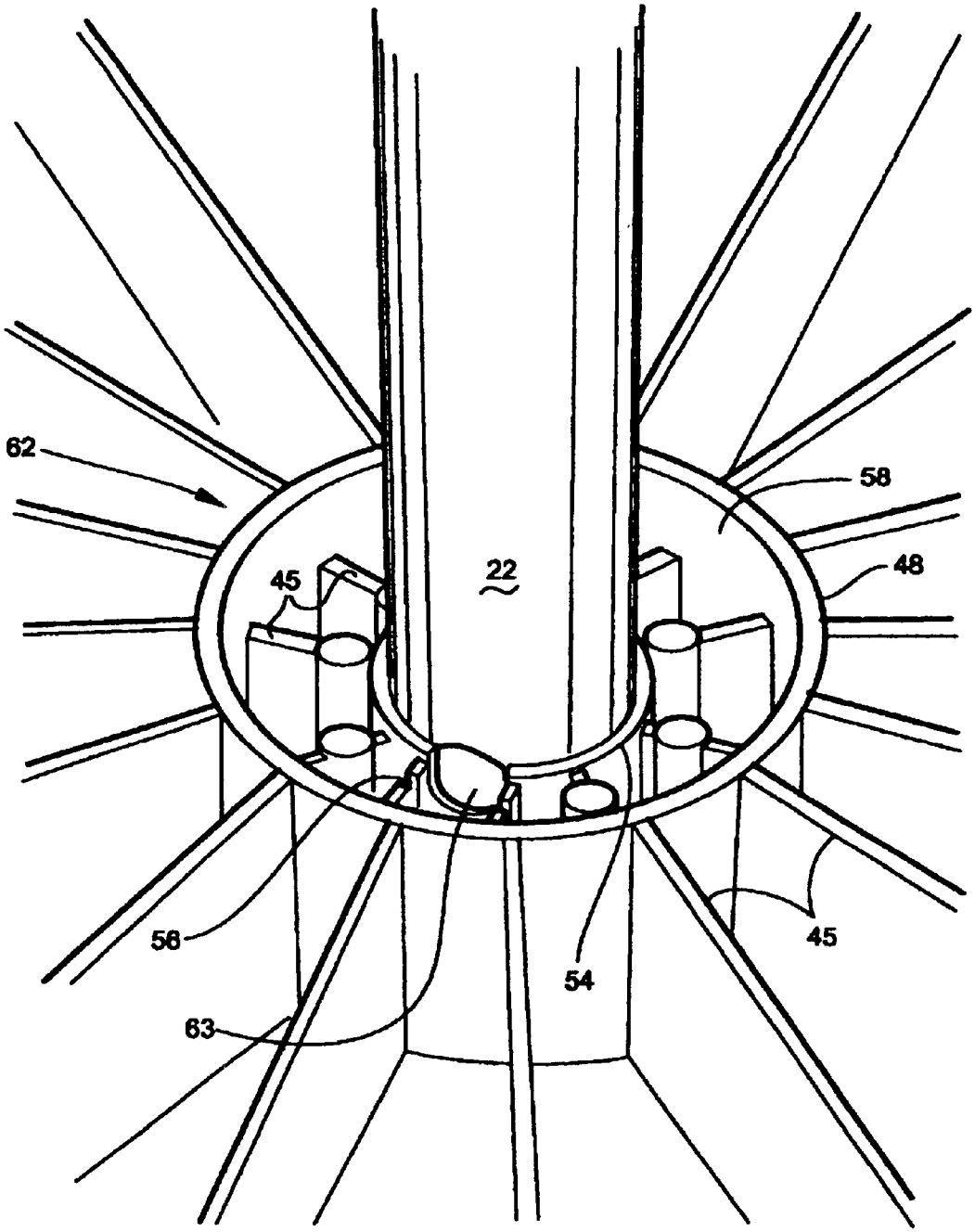
FIG. 14 is a fragmentary, enlarged and perspective view of the post-securing shelf underside section of the new shelf construction of the present invention displaying a post aperture through which may be inserted a pin to secure the shelf to the post.

Thus, the one piece shelf 20 can be positioned over post 22 as shown in FIG. 14 and sustained at a predetermined location by the insertion of a pin through an aperture 63 in post 22 with the extending ends of the pin cooperatively received by indents 56 to secure the shelf at a precise location on post 22.

When rotary shelf assemblies like those disclosed herein are shipped, they are usually collapsed to the extent possible in order to make shipping sizes more efficient by occupying less three dimensional space and prevent shelf damage. When the assemblies are reduced in size, the shelves are usually brought together still connected with the post and are secured so that they do not move during shipment. Securement of the shelves against movement is sometimes complicated and in most instances expensive.

Figure 16:
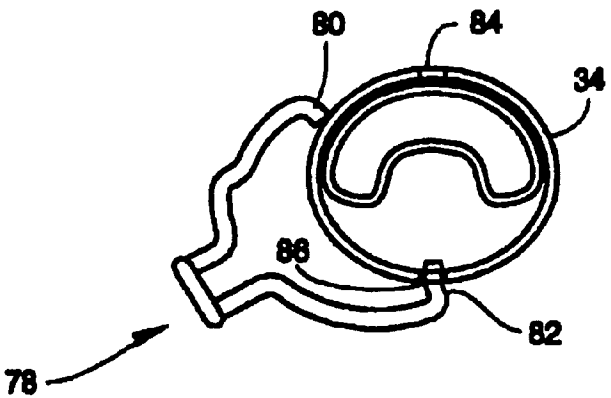
FIG. 16 is a view similar to that shown in FIG. 15 with the spring being disengaged to free the shelves for movement.
Figure 15:
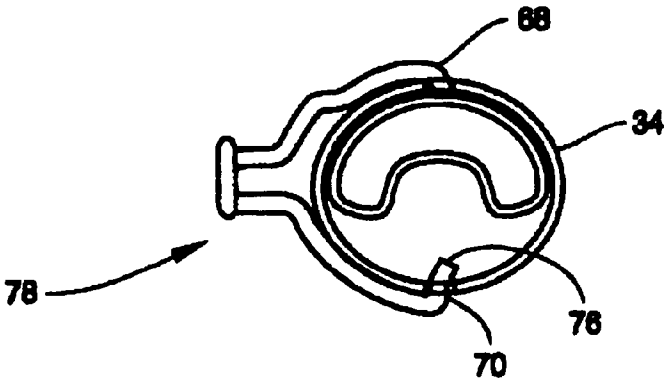
FIG. 15 is a spring clip effective to limit any movement of the shelves along the post when they are collapsed against each other for shipment or other movement, the spring being in the engaged position to limit such movement.

In the present rotary shelf assembly, a securement clip has been developed that is simple in construction, easy to install and reliable in operation. An embodiment of the clip is shown in FIGS. 15 and 16 wherein a continuous metallic clip shown generally as 78 fully encircles and locks to post 34 at its terminal ends 80, 82, each end engaging cooperative apertures 84, 86. Clip 78 is formed with a bias to urge tips 80, 82 toward each other and cause them to become embedded within apertures 84, 86 in a secured manner. Clip 78 is effective in limiting any movement of the shelves along the post during shipment.

FIG. 16 illustrates the positioning of clip 78 as it is urged against post 34 and into apertures 82, 84, and FIG. 15 shows clip 78 in the final engaged and shelf-securing position. For ease in installation, a slightly offset end extension 88 is formed on tip 82 so that it can be initially engaged or seated in aperture 86 when clip 78 is thereafter urged forwardly until tip 80 engages aperture 84.

Figure 18:
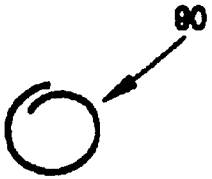
FIG. 18 is an end elevational view of the rolled pin shown in FIG. 17.
Figure 17:
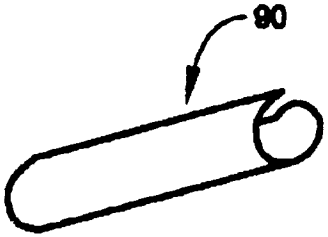
FIG. 17 is perspective view of the rolled pin formed of flat stock.

Another alternative component for insuring the secure positioning of shelf 20 against post 58 is a rolled pin [go] *90* as shown in FIGS. 17 and 18. Pin [go] *90* is formed from a sheet of preferably metallic material in flat form which is thereafter rolled to form a cylindrical and somewhat flexible pin. The springiness of pin [go] *90* permits it to be slightly compressed when placed in aperture 72 and indents 74 so that upon release, it springs outwardly against the surfaces of those elements and resists any movement of shelf 20 with respect to post 58.

From the proceeding description, it can be seen that an adjustment device for a cabinet assembly, a novel shelf construction and a shelf securing element have been provided that will meet all of the advantages of prior art devices and offer additional advantages not heretofore achievable. With respect to the foregoing invention, the optimum dimensional relationship to the parts of the invention including variations in size, materials, shape, form, function, and manner of operation, use and assembly are deemed readily apparent to those skilled in the art, and all equivalent relationships illustrated in the drawings and described in the specification are intended to be encompassed herein.

The foregoing is considered as illustrative only of the principles of the invention. Numerous modifications and changes will readily occur to those skilled in the art, and it is not desired to limit the invention to the exact construction and operation shown and described. All suitable modification and equivalents that fall within the scope of the appended claims are deemed within the present inventive concept.

What is claimed is:

1. A rotary shelf [assembly] mechanism comprising:

a [telescopically] *vertically* adjustable [vertical] post [arrangement];

first and second mounting brackets spaced apart from and opposing each other supporting the post [arrangement];

at least one single piece shelf connected to the post [arrangement], the post [arrangement] having pin-receiving apertures proximate the at least one connected shelf, each of the at least one shelf having [a post-securing section including a hub with] a post-encircling sleeve [disposed within and spaced from the hub; the post-encircling sleeve] including [a] *an operably connected* pin-receiving indent [operatively connected with the post-encircling sleeve]; and a pin extending through the [post arrangement] pin-receiving apertures[,] *and being* cooperatively received [and retained] by the pin-receiving indent of the at least one shelf [and through the post-encircling sleeve] to *vertically* secure the at least one shelf to the post [arrangement] so that the post [arrangement] and the shelf rotate[s] as one unit, *wherein the post-encircling sleeve of the at least one shelf has a post-receiving opening, the pin-receiving indent is a rectangularly shaped recess having first and second closed ends facing said post-receiving opening and at least partial first and second sides communicating with the post-receiving opening, the pin is an elongated element having first and second ends and a cylindrically shaped pin body portion, and the pin-receiving indent engages the first and second pin ends and the cylindrically shaped pin body portion when the pin operably secures the at least one shelf to the post.*

[2. The mechanism as claimed in claim 1 wherein the pin is an elongated element having first and second ends and the pin-receiving indent engages at least one of the pin ends when the pin operably secures the at least one shelf to the post arrangement.]

[3. The mechanism as claimed in claim 1 wherein the hub of the at least one shelf has a post-receiving opening, the pin-receiving indent is a rectangularly shaped recess communicating with the post-receiving opening, the post arrangement further including pin-receiving apertures at each of a plurality of shelf positions.]

[4. The mechanism as claimed in claim 3 wherein the pin is an elongated element having first and second ends and the pin-receiving indent engages at least one of the pin ends when the pin operably secures the at least one shelf to the post arrangement.]

* * * * *